United States Patent [19]

Stoltman

[11] Patent Number: 4,916,618

[45] Date of Patent: Apr. 10, 1990

[54] VEHICLE TRACTION CONTROLLER

[75] Inventor: Donald D. Stoltman, Rochester, N.Y.

[73] Assignee: General Motors Corporation, Detroit, Mich.

[21] Appl. No.: 242,925

[22] Filed: Sep. 12, 1988

[51] Int. Cl.$^4$ .............................................. B60K 28/16
[52] U.S. Cl. .................... 364/426.02; 180/197
[58] Field of Search ............... 364/426.02, 426.03; 180/197; 361/238; 303/95, 96, 100, 106; 123/333, 361

[56] References Cited

U.S. PATENT DOCUMENTS

| | | | |
|---|---|---|---|
| 4,637,487 | 1/1987 | Nakamura et al. | 180/197 |
| 4,664,453 | 5/1987 | Kade et al. | 303/100 |
| 4,721,176 | 1/1988 | Kabasin et al. | 180/197 |
| 4,762,196 | 8/1988 | Harada et al. | 303/106 |
| 4,768,608 | 9/1988 | Hrovat | 364/426.02 |
| 4,771,848 | 9/1988 | Namba et al. | 180/197 |
| 4,823,904 | 4/1989 | Dietrich | 180/197 |

*Primary Examiner*—Gary Chin
*Attorney, Agent, or Firm*—Howard N. Conkey

[57] ABSTRACT

A system and method of limiting the wheel slip of a driven wheel of a vehicle to a maximum allowable value so as to maximize the driven wheel tractive force is described. The driven wheel tractive force represented by an expression including the engine intake air flow area, a load variable function and the speed of an undriven wheel is continually monitored. The value of the monitored tractive force at the time the driven wheel slip reaches a maximum allowable value is identified and stored. When the slip exceeds the maximum allowable value, an intake air flow area is limited to a value determined to return the driven wheel tractive force to the identified tractive force at the maximum allowable wheel slip value.

4 Claims, 2 Drawing Sheets

VEHICLE TRACTION CONTROLLER

This invention relates to a vehicle traction control system and more particularly to such a system which limits the engine output by control of the throttle position to a value establishing a previously identified tractive wheel force at the maximum allowable wheel slip.

It is a common experience with automotive vehicles for excess wheel slip or spinning to occur during vehicle acceleration. This happens when the vehicle operator initiated engine torque delivered to the driven wheels are such that the frictional forces between the tire and the road surface are overcome. While a small amount of slip between the tire and road surface is necessary in order to achieve a driving force, excessive slip results in the reduction of effective driving force.

This invention provides for an improved system and method of limiting the wheel slip to a maximum allowable value so as to maximize the driven wheel tractive force. In accord with this invention, the driven wheel tractive force represented by an expression including the engine intake air flow area, a load variable function and the undriven wheel speed is continually monitored. The value of the monitored tractive force at the time the driven wheel slip reaches a maximum allowable value is identified and stored. When the slip exceeds the maximum allowable value, an intake air flow area is scheduled to return the driven wheel tractive force to the identified tractive force at the maximum allowable wheel slip value.

The invention may be best understood by reference to the following description of a preferred embodiment and the drawings in which.

Figure 1:
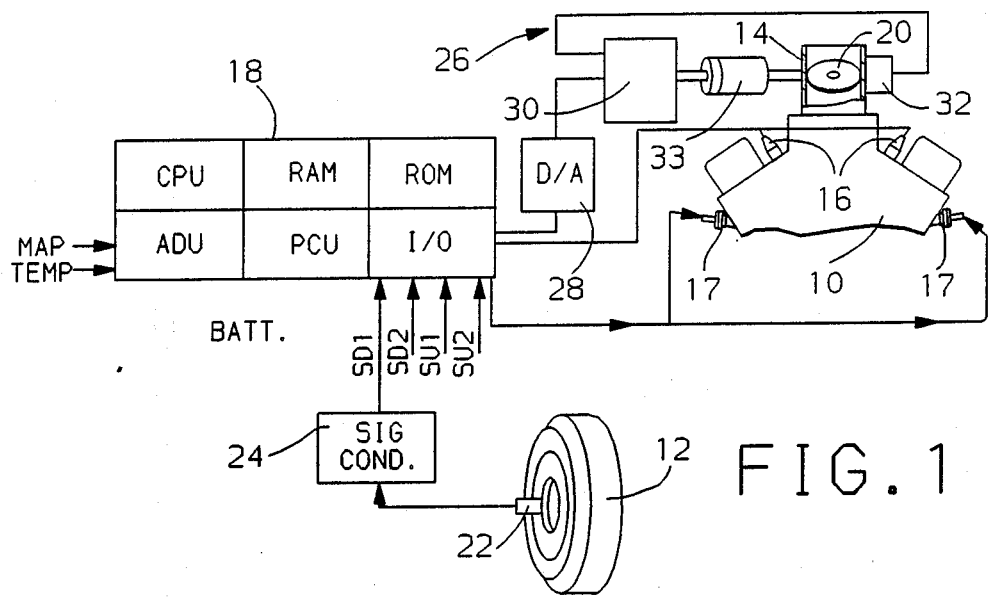
FIG. 1 is a general diagram of an engine controller for limiting the driven wheel slip in accord with the principles of this invention.

Referring to FIG. 1, there is illustrated a vehicle internal combustion engine 10 that operates to apply a driving torque via the conventional vehicle drive train to the vehicle driven wheels, such as the wheel 12. Air is drawn into the engine intake manifold through a throttle bore 14 and mixed with fuel injected into the intake manifold by electromagnetic fuel injectors 16. The air and fuel mixture in turn is drawn into the cylinders of the engine 10 where it is ignited by respective spark plugs 17 and undergoes combustion, thereby generating torque applied to the driven wheels.

The injectors 16 are controlled by a digital control unit 18 in response to measured values of engine parameters including the manifold absolute pressure MAP provided by a conventional pressure sensor, engine coolant temperature TEMP provided by a conventional temperature sensor and engine speed to establish a predetermined air/fuel ratio, such as the stoichiometric ratio. The spark plugs 17 are controlled in response to parameters such as manifold pressure and engine temperature to establish a desired ignition timing at a scheduled advance angle before cylinder top dead center.

Air flow into the engine 10 is controlled by a conventional throttle blade 20 in the throttle bore 14 that is positioned by the vehicle operator for controlling the operation of the engine 10. As will be described, the position of the throttle blade 20 is limited so as to prevent the torque applied to the vehicle wheels of the engine 10 from becoming excessive, thereby causing the wheels to slip beyond a predetermined maximum value.

In order to provide for traction control, the speed of the driven and undriven wheels are provided to the control unit 18. These signals are in the form of square wave signals SD1 and SD2 (for the driven wheels) and SU1 and SU2 (for the undriven wheels) having a frequency directly proportional to wheel speed. The wheel speed sensors may take the form of an electromagnetic pickup 22 sensing the passing of teeth rotating with the wheel 12. The resulting alternating signal having a frequency proportional to the speed of the wheel 12 is provided to a signal conditioner 24 which provides the square wave signal SD1 representing the speed of the driven wheel 12. The remaining wheel speed signals are provided in similar manner in response to rotation of the remaining three wheels of the vehicle.

The power output of the engine is limited by the electronic controller by establishing a limit position of the throttle blade 20 corresponding to a predetermined throttle area determined to produce a wheel tractive force identified during vehicle acceleration and corresponding in time to a maximum allowable wheel slip value. The throttle position limit is established when the slip exceeds the maximum allowable value by means of a closed loop control circuit 26. The control unit 18 provides a digital signal to a digital-to-analog converter 28 representing a commanded limit position of the throttle blade 20. The analog signal output of the converter 28 representing the limit position is provided to a drive circuit 30 in the closed loop control circuit 22. The drive circuit 30 also receives a signal representing the actual position of the throttle blade 20 from a potentiometer 32 driven by the shaft of the throttle blade 20.

The drive circuit 30 is a conventional proportional plus integral circuit responding to the difference between the commanded limit position of the throttle blade from the converter 28 and the actual position provided by the potentiometer 32. The sum of the integral and proportional terms from the circuit 30 are provided to a torque motor 33 which drives the throttle blade 20 to a position in accord with the limit position from the digital-to-analog converter 28.

The electronic controller 18 takes the form of a digital computer that is standard in form and includes a central processing unit (CPU) which executes an operating program permanently stored in a read only memory (ROM) which also stores tables and constants utilized in controlling the fuel injected by the injectors 16, in controlling the spark timing signals to the spark plugs 17 and in positioning the throttle blade 20 for limiting engine power to control wheel slip. Contained within the CPU are conventional counters, registers, accumulators, flag flip flops, etc. along with a clock which provides a high frequency clock signal.

The computer also includes a random access memory (RAM) into which data may be temporarily stored and from which data may be read at various address locations determined in accord with the program stored in the ROM. A power control unit (PCU) receives battery voltage and provides regulated power to the various operating circuit in the control unit 18.

The control unit 18 further includes an input/output (I/O) circuit comprised of an input section for receiving the squarewave speed signals representing the speed of the four vehicle wheels and an output section that provides the digital signal to the digital-to-analog converter 28 representing a commanded limited position of the throttle valve 20, provides a timed injection pulse to the fuel injector 16 and provides timed signals to the spark plugs 17 to ignite the mixture in the individual cylinders. The input/output circuit may also receive an output from a conventional vehicle ignition distributor or other well known engine position transducers providing a signal in the form of a pulse with each intake event. These pulses are utilized by the control unit 18 for initiating the injection pulses to the injectors 16 and the spark signals to the spark plugs 17.

The input/output circuit also includes an input counter section which receives the pulse output of the signal conditioners such as the conditioner 36 representing the speed of the four vehicle wheels. The wheel speeds are then determined such as by counting clock pulses between wheel speed pulses. Alternatively, a separate computer may be utilized for receiving and processing the wheel speed inputs so as to establish the four wheel speeds. These speeds will then be available to the control unit 18 for traction control as will be described.

The control unit 18 further includes an analog-to-digital unit (ADU) which provides for measurement of the analog's signals including the manifold absolute pressure and a signal representing engine temperature. These signals are sampled and converted under control of the CPU and stored in ROM designated RAM memory locations.

Figure 2:
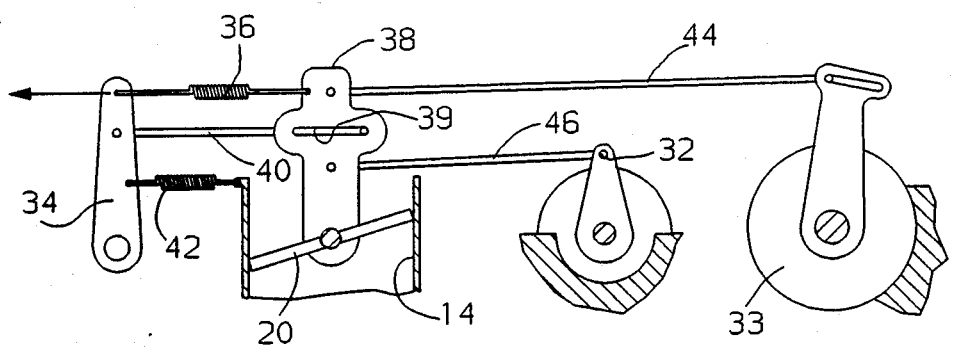
FIG. 2 is a schematic of a mechanism for 10 positioning and limiting the throttle position in the engine throttle bore.

The apparatus for controlling the position of throttle blade 20 in the throttle bore 14 in response to the vehicle operator input and for limiting the position of the throttle blade 20 to limit wheel slip is illustrated in FIG. 2. In general, the throttle blade 20 is positioned by the operation of the accelerator pedal by the vehicle operator by means of a lever 34 coupled to a spring 36 to a throttle arm 38. The lever 34 is also coupled to the throttle arm 38 via a rod 40 secured at one end to the lever 34 and having its opposite end bent so as to extend through a slot 39 in the throttle arm 38 thereby forming a lost motion connection.

The spring 36 normally biases the lever 34 and the throttle arm 38 toward one another such that the end of the rod 40 extending through the slot 39 engages the extreme end of the slot 39. With this arrangement, a spring 42 biases the throttle lever 38 in direction to close the throttle blade 20 via the lever 34 and the rod 40 bearing against the end of the slot 39 in the throttle arm 38.

In operation, as the lever 34 and rod 40 are moved by operation of the vehicle accelerator pedal, the throttle arm 38 is moved therewith via the bias of the spring 36 to open the throttle blade 20. Upon release of the throttle by the vehicle operator, the throttle blade 20 is returned to the closed position via the spring 42.

In order to limit the throttle position to prevent the driven wheel slip from exceeding a predetermined value, the DC torque motor 33 previously described is coupled to the throttle arm 38 via a rod 44. Under control of the controller 18 via the closed loop circuit 26, the DC torque motor 33 may be energized to generate a torque tending to rotate its output shaft in a clockwise direction as viewed in the drawing against the force of the spring 36 to limit the throttle position. Within the limits established by the slot 39, the throttle 20 may be positioned independent of the position of the lever 34 established by the vehicle operator to limit the power output of the engine applied to the wheel 12 to limit wheel slip.

The throttle position sensor 32 previously described is positioned by means of a linkage 46 to provide a signal representative of the position of the throttle 20 in the throttle bore 14.

In the limit of the wheel slip, the present invention utilizes the relationship between the operator input to the engine via the control of the throttle position in the throttle bore 14 and the wheel tractive force. The relationship used in this invention is derived as follows:

Engine Power is related to the engine mass fuel rate. Assuming a known air/fuel ratio, such as the stoichiometric ratio, engine power is related to the mass air rate through the engine throttle bore 14 which in turn is a function of the area of the throttle bore established by the position of the throttle blade 20 and the mass velocity of the air through the throttle bore. Assuming the pressure above the throttle 20 as substantially constant at barometric pressure, the air mass velocity through the throttle bore is a function of the engine load such as represented by the manifold absolute pressure.

Figure 4:
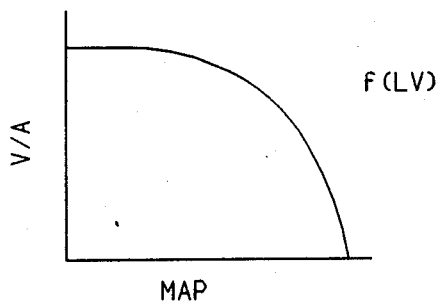
FIG. 4 is a graph illustrating the air mass velocity per unit area as a function of an engine load variable.

From the foregoing relationships, the power output of the engine HP can be represented by the expression $$HP = A*f(LV) \tag{1}$$

where A is the air flow area of the throttle bore 14 established by the position of the throttle blade 20 and f(LV) is a function of the load variable such as manifold absolute pressure. The load variable function f(LV) is illustrated in FIG. 4. As seen therein, the value of a dependent variable air mass velocity per unit area is plotted as a function of manifold absolute pressure, the load variable function utilized. In general, this relationship is determined by testing of the engine and storing the values in the ROM of the controller 18.

The engine power output can also be related to the vehicle wheels and in particular to the tractive wheel force. Without slip, the engine power factor HP is related to the undriven wheel velocity, which is a measure of vehicle speed, and the tractive wheel force. This relationship is represented by the expression $$Hp = V_v*F \tag{2}$$

where $V_v$ is the vehicle speed and F is the tractive wheel force. By equating the above two expressions, the tractive wheel force can be represented by the expression $$F = A*f(LV)/V_v. \tag{3) ps}$$

In accord with this invention, the value of the tractive wheel force represented by the foregoing expression is continuously monitored while calculating the wheel slip during vehicle acceleration. The value of the tractive force existing when the wheel slip attains a maximum allowable value is stored in memory. This stored tractive wheel force represents the limit tractive wheel force. Thereafter if the wheel slip exceeds the maximum allowable value, the area of the throttle bore 14 required to return the tractive wheel force to the stored limit value determined to produce the maximum allowable wheel slip value is computed. This throttle bore area is then established by positioning the throttle blade 20 in the throttle bore 14 to limit the tractive wheel force to the stored value thereby returning the wheel slip to the maximum allowable value.

Figure 3:
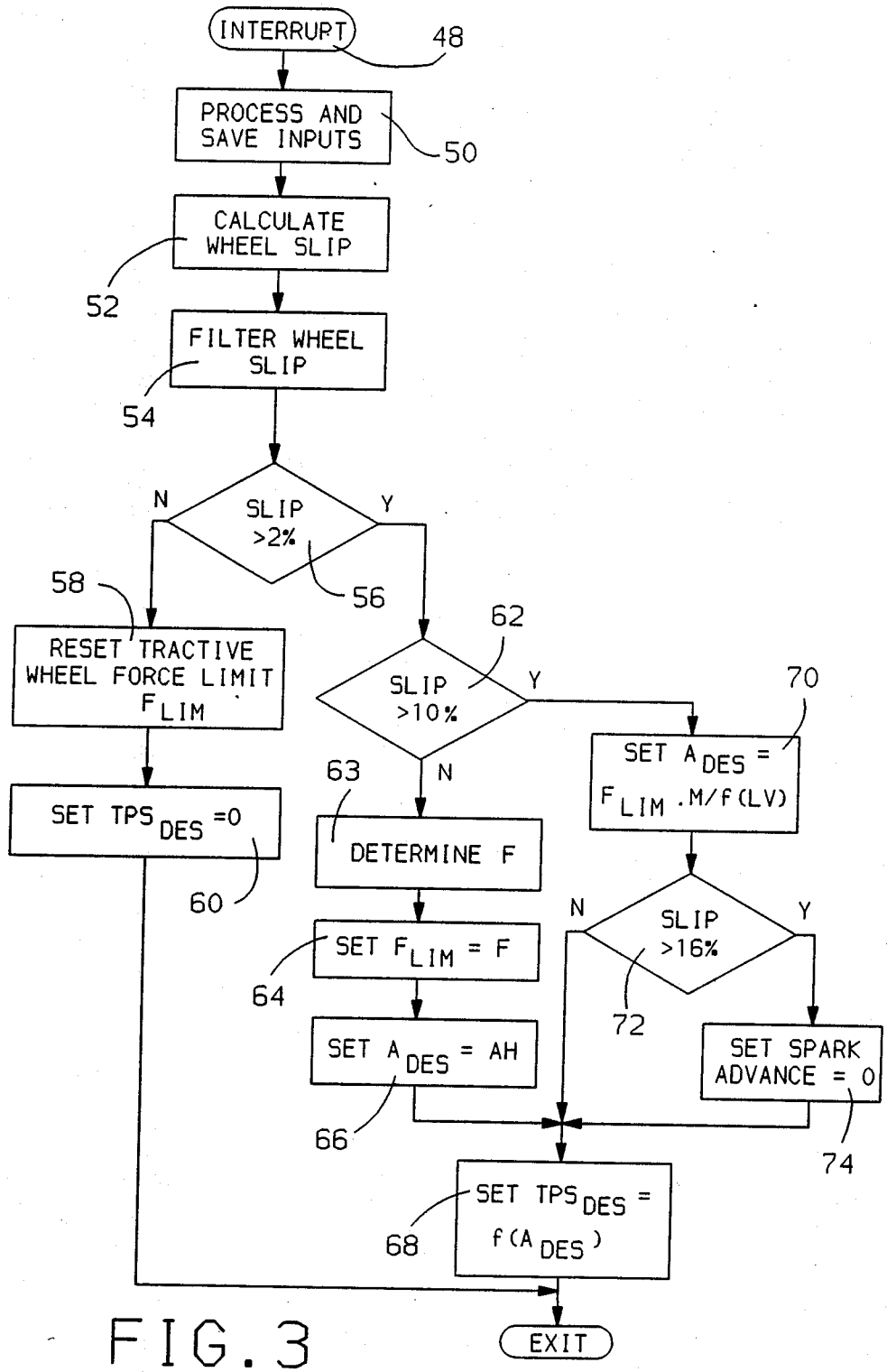
FIG. 3 is a diagram illustrating the operation of the system of FIG. 1 in limiting wheel slip.

The routine for limiting wheel slip is illustrated in FIG. 3. The routine for limiting wheel slip begins at step 48 and proceeds to a step 50 where the control unit 18 processes and saves the various inputs thereto including the manifold absolute pressure and engine temperature supplied to the ADU of the control unit 18 and the four wheel speed signals provided to the I/O.

From step 50, the program proceeds to a step 52 where the value of wheel slip is calculated. In general, slippage of the driven wheels of the vehicle is represented by the difference in speed between the driven and undriven wheels. While other expressions may be used, in this embodiment wheel slip is determined by the expression (Sd − Su)/Su where Sd is the speed of the fastest driven wheel and Su is the average speed of the two undriven wheels. The determined value of wheel slip is stored in the RAM for use of the traction control routine of this invention. At the next step 54, the wheel slip calculated at step 52 is filtered such as by a first order lag filter equation.

At step 56, the slip determined at step 52 is compared with a low slip threshold value such as 2%. Assuming the slip value is equal to or less than 2%, the program proceeds to a step 58 where a tractive wheel force limit value $F_{lim}$ is reset. As will be described, the tractive wheel force limit value $F_{lim}$ is the determined tractive wheel force that existed when the wheel slip is at a maximum wheel slip value.

From step 58, the program proceeds to step 60 where the throttle limit command position $TPS_{DES}$ is set so that the throttle position is allowed to be positioned by the vehicle operator unconstrained.

Returning to step 56, if the slip determined at step 52 is greater than 2%, the program proceeds to a step 62 where the slip value is compared with another value representing the maximum allowable wheel slip value. In this embodiment, the maximum allowable wheel slip value above which excessive slip is occurring is 10%. If the slip is greater than 2%, but less than 10%, the program proceeds to a step 64 where the tractive wheel force F is computed by use of the foregoing expression (3). In this regard, the load variable function f(LV) is retrieved from a lookup table in the ROM as previously described as a function of a manifold absolute pressure value read and stored at step 50. Further, vehicle speed is determined to be the speed of the undriven wheel also measured and stored at step 50.

At step 64, the value of the limit tractive wheel force $F_{lim}$ is set equal to the value of tractive wheel force determined at step 62. At step 66, the value of a desired effective area $A_{DES}$ of the throttle bore 14 is incremented. At step 68, the desired throttle position $TPS_{DES}$ is set equal to a function of the desired effective area $A_{DES}$, the desired throttle position being obtained such as by a lookup table equating throttle area to throttle position. The desired throttle position is a limit throttle position and as long as the actual throttle position is less than the limit position, the output to the torque motor 33 will be zero. However, if the actual throttle position is greater than the limit throttle position set at step 68, the output to the torque motor 33 will be controlled to a value to limit the throttle position to the desired value established at step 68.

The foregoing steps 63-68 are repeated as long as the wheel slip determined at step 52 is between 2 and 10%. However, if the wheel slip should exceed the maximum allowable value of 10%, the program proceeds from step 62 to a step 70. When this occurs, it is noted that the tractive wheel force value last stored at step 64 as the limit value $F_{lim}$ is the tractive force corresponding in time to the maximum allowable wheel slip value of 10% and is therefore the maximum allowable or limit tractive force.

At the step 70, the area of the throttle $A_{DES}$ for reestablishing the limit tractive wheel force stored at step 64 is computed in accord with the expression $$A_{DES} = F_{lim} * V_v / f(LV). \qquad (4)$$

This expression is derived from the above expression (3) and results in a value of throttle area for restoring the tractive wheel force to the value of $F_{lim}$ stored at step 64 and representing the tractive wheel force corresponding in time with the maximum allowable wheel slip value. From step 70, the program proceeds to a step 72 where the wheel slip is compared with a high value such as 16%. Assuming the slip is below 16%, the program proceeds to the step 68 where the throttle position required to establish the throttle bore area computed at step 70 is retrieved from the lookup table and provided to the digital-to-analog converter 28. The output to the torque motor 33 is then controlled to a value to limit the throttle position to the desired value establishing the throttle bore area computed at step 70. This limited value functions to reduce the tractive wheel force to reestablish the wheel slip at the maximum allowable value.

Returning to step 72, if the value of wheel slip should exceed 16%, the program proceeds to a step 74 where the spark advance value for controlling the spark plugs 17 is set to zero to further reduce the torque output of the engine to assist in restoring the wheel slip to the maximum allowable value of 10%.

When the wheel slip is again reduced to a value below 10%, the program proceeds from step 62 to again repeat the steps 63 through 66. As previously indicated, the value of the limited area of the throttle bore $A_{DES}$ is incremented at step 66 which provides for an increase in the limited throttle position until such time that the slip established at step 62 is again exceeded or until the value of the desired limited throttle angle becomes greater than the actual throttle angle whereby the limiting of the throttle position is no longer effective.

The foregoing description of a preferred embodiment of the invention for the purpose of illustrating the invention is not to be considered as limiting the invention since many modifications may be made by the exercise of skill in the art without departing from the scope of the invention.

The embodiments of the invention in which an exclusive property or privilege is claimed are defined as follows:

1. A system for limiting the slip of a vehicle wheel driven by an engine having a throttle bore through which air is drawn into the engine and a rotatable throttle valve in the throttle bore for limiting the effective area of the throttle bore and therefore the mass air flow rate into the engine, the system comprising:
   means for determining the slip of the vehicle wheel,
   means effective when the determined slip is less than a predetermined maximum value for repeatedly determining a value F representing the tractive force between the wheel and the road surface in accord with a predetermined function including the effective area of the throttle bore;

means for storing a value $F_{lim}$ equal to the last determined value of F;

means effective when the determined slip is greater than the predetermined maximum value for repeatedly determining a desired effective area $A_{DES}$ of the throttle bore for establishing the tractive force between the wheel and the road surface at a value equal to the stored value $F_{lim}$; and means for limiting the effective area of the throttle bore to $A_{DES}$ while the determined slip is greater than the predetermined maximum value, whereby the tractive force between the wheel and the road surface is limited to the value $F_{lim}$ to limit the wheel slip at the predetermined maximum value.

2. A system for limiting the slip of a vehicle wheel driven by an engine having a throttle bore through which air is drawn into the engine and a rotatable throttle valve in the throttle bore for limiting the effective area of the throttle bore and therefore the mass air flow rate into the engine, the system comprising:

means for determining the slip of the vehicle wheel;

means effective when the determined slip is less than a predetermined maximum value for repeatedly determining a value F representing the tractive force between the wheel and the road surface in accord with a predetermined function defined by the expression $F = A*X$ where A is the effective area of the throttle bore and X is a function of predetermined operating parameters;

means for storing a value $F_{lim}$ equal to the last determined value of F;

means effective when the determined slip is greater than the predetermined maximum value for repeatedly determining a desired effective area $A_{DES}$ of the throttle bore for establishing the tractive force between the wheel and the road surface at a value equal to the stored value $F_{lim}$, the desired effective area being determined in accord with the expression $A_{DES} 1 = F_{lim}*(1/X)$; and means for limiting the effective area of the throttle bore to $A_{DES}$ while the determined slip is greater than the predetermined maximum value, whereby the tractive force between the wheel and the road surface is limited to the value $F_{lim}$ to limit the wheel slip at the predetermined maximum value.

3. The system of claim 2 further including means for measuring the value $V_v$ of vehicle speed and wherein X is equal to $f(LV)/V_v$ where $f(LV)$ is a function of a predetermined parameter representing engine load.

4. A method of limiting the slip of a vehicle wheel driven by an engine having a throttle bore through which air is drawn into the engine and a rotatable throttle valve in the throttle bore for limiting the effective area of the throttle bore and therefore the mass air flow rate into the engine, the method comprising the steps of:

determining the slip of the vehicle wheel;

repeatedly determining a value F representing the tractive force between the wheel and the road surface in accord with a predetermined function including the effective area of the throttle bore when the determined slip is less than a predetermined maximum value;

storing a value $F_{lim}$ equal to the last determined value of F;

repeatedly determining a desired effective area $A_{DES}$ of the throttle bore for establishing the tractive force between the wheel and the road surface at a value equal to the stored value $F_{lim}$ when the determined slip is greater than the predetermined maximum value; and limiting the effective area of the throttle bore to $A_{DES}$ while the determined slip is greater than the predetermined maximum value, whereby the tractive force between the wheel and the road surface is limited to the value $F_{lim}$ to limit the wheel slip at the predetermined maximum value.

* * * * *